(No Model.)
2 Sheets—Sheet 1.
M. W. THOMAS.
CULTIVATOR.
No. 566,549.
Patented Aug. 25, 1896.
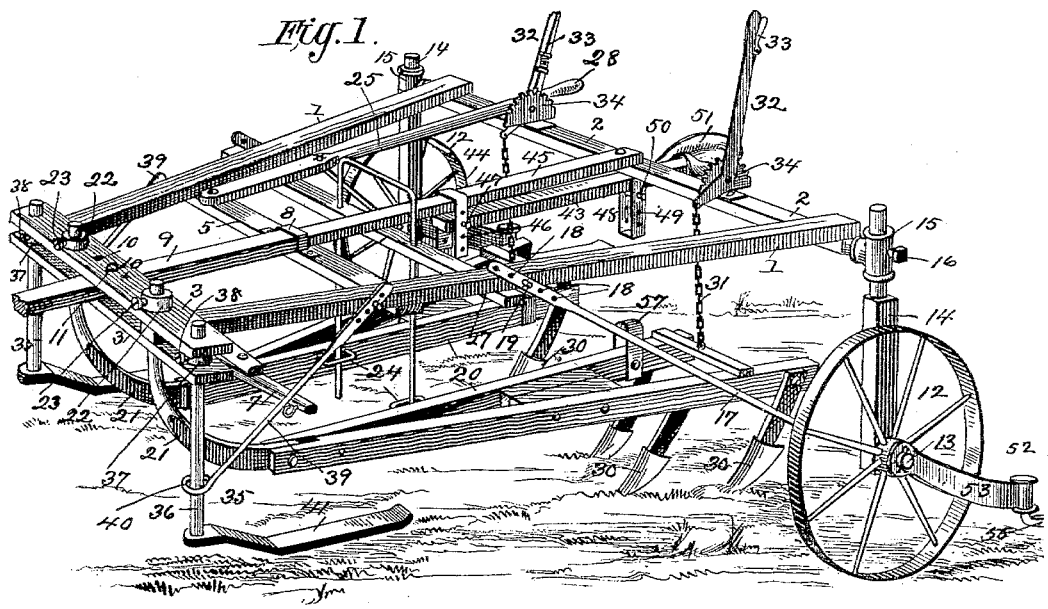
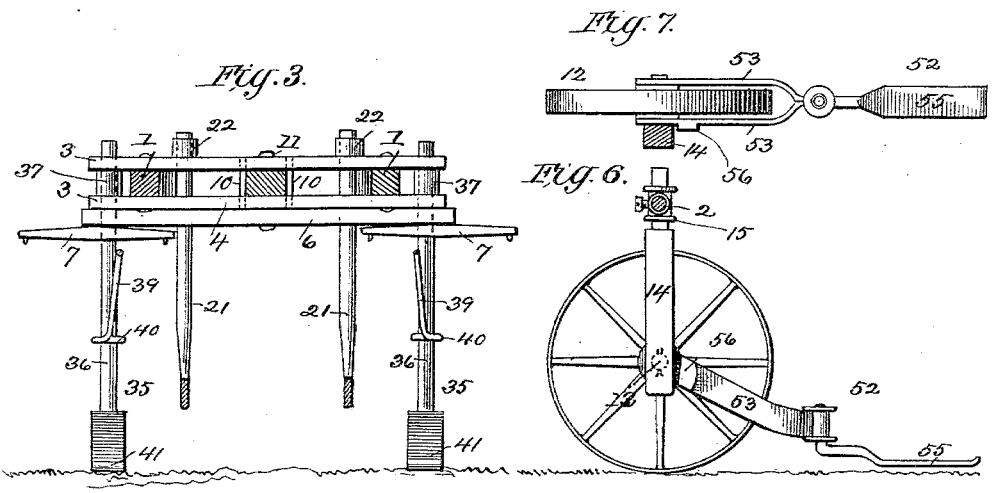
Witnesses
J. A. Ryan
V. B. Hillyard
Inventor
M. W. Thomas
By his Attorneys
C. A. Snow & Co.

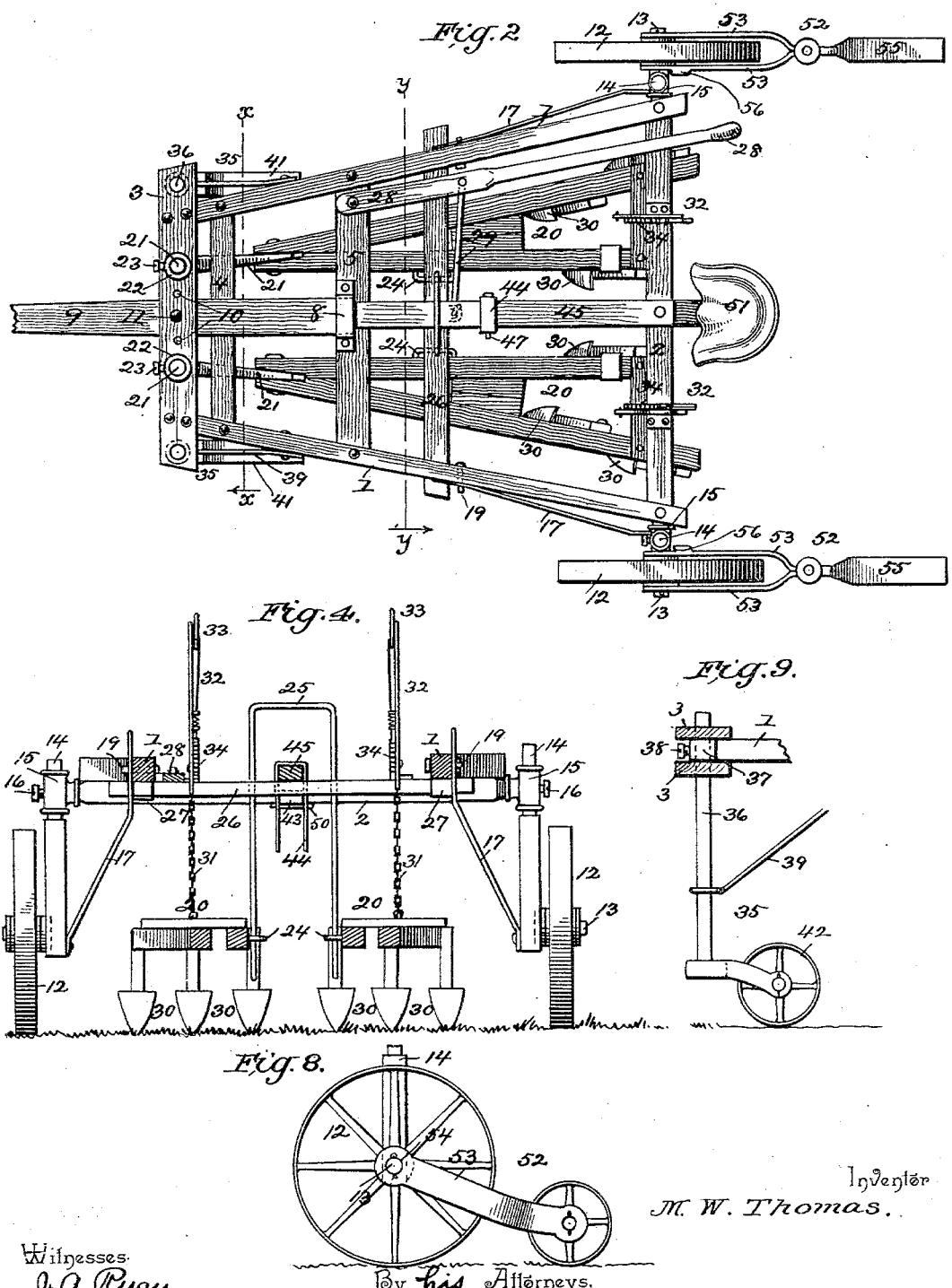

UNITED STATES PATENT OFFICE.

MIKEL WILLIAM THOMAS, OF DUNREITH, INDIANA.

CULTIVATOR.

SPECIFICATION forming part of Letters Patent No. 566,549, dated August 25, 1896.

Application filed April 19, 1895. Serial No. 546,388. (No model.)

*To all whom it may concern:*

Be it known that I, MIKEL WILLIAM THOMAS, a citizen of the United States, residing at Dunreith, in the county of Henry and State of Indiana, have invented a new and useful Cultivator, of which the following is a specification.

This invention relates to that class of agricultural implements especially designed for tilling the soil, for loosening the same about the plants, or preparing the ground for the sowing of the seed, and has for its object to provide a machine which can be used with equal facility with or without a tongue, and which will admit of the various adjustments of the cultivating devices, either to plow deep or shallow or move them laterally to and from the rows of plants, as desired, the several adjustments being under the control of the driver when walking or riding.

Other objects and advantages will be apparent from the following description, taken in connection with the accompanying drawings, in which—

Figure 1 is a perspective view of an agricultural implement embodying the principles of the invention. Fig. 2 is a top plan view of the same. Fig. 3 is a cross-section on the line X X of Fig. 2, looking in the direction of the arrow, the front supports being shown in full lines. Fig. 4 is a cross-section on the line Y Y of Fig. 2, looking to the rear, as indicated by the arrow. Fig. 5 is a side elevation of the seat and its bar, showing the adjustable mountings therefor. Fig. 6 is a detail view, in side elevation, of one of the rear standards, showing the support operatively connected with the rear wheel. Fig. 7 is a top plan view of the parts shown in Fig. 6. Fig. 8 is a view of the rear support detached, showing the runner replaced by a caster-wheel. Fig. 9 is a detail view of a front support provided with a caster-wheel.

The frame of the implement comprises side beams 1, which converge from the rear to the front end of the machine, a rear cross-beam 2, connected near its ends with the rear ends of the side beams 1, and parallel cross-bars 3, which connect the front ends of the side beams 1. The side beams 1 are strengthened by cross-bars 4 and 5, to the former of which is attached a doubletree 6, having singletrees 7 at its ends, to which the team is hitched in the ordinary manner. A keeper 8 is centrally disposed upon the cross-bar 5, and receives the inner end of the pole or tongue 9 when the latter is in use, said pole passing between the bars 3 and held against lateral displacement by pins or bolts 10, disposed one upon each side of the said pole and supported in the bars 3. The pole or tongue may be held in working position by any desired means, and, as shown, is secured to the frame of the implement by a bolt 11 passing through registering openings in the cross-bar 3 and the said pole.

The ground-wheels 12 are mounted upon spindles 13, projecting laterally from standards 14, which pass vertically through sleeves 15 at the ends of the cross-beam 2, binding-screws 16 being provided in the sides of the sleeves 15 to bear laterally against the sides of the standards 14 and hold the latter within the sleeves at the required elevation, whereby the rear end of the machine can be raised and lowered as desired. These standards 14 are strengthened by braces 17, which are attached at their lower ends to the lower portions of the standards and which incline upwardly and forwardly and have adjustable connection with the side beams 1 at a point midway of their ends, the upper end portions of the braces being provided with a series of openings 18 to receive a pin or fastening 19, by means of which the said braces are adjustably connected with the side beams 1. Obviously when adjusting the standards 14 vertically the said braces 17 must be lengthened or shortened accordingly to admit of the said standards occupying a nearly vertical position without binding in the sleeves 15, and for this reason the braces 17 have adjustable connection with the frame in the manner set forth.

The cultivators 20, two in number, are pivotally connected at their front ends to draft bars or rods 21, which are adjustably mounted in the cross-bars 3, being held in the adjusted position by collars 22, placed upon the upper projecting ends and held to the said projecting ends of the draft-rods by means of binding-screws 23, the lower ends of the said draft-rods being curved rearwardly and having the cultivators pivoted thereto. These cultivators 20 may have any desired shape and, as shown, are of V form, the side beams converging and having attachment at their convergent ends with the said draft rods or bars 21. Keepers or eyes 24 are located on the sides of the inner beams of the cultivators and receive the vertical portions of an arch 25, pendent from a cross-bar 26, held in suitable keepers 27 on the under side of the beams 1. An operating-lever 28 is pivoted at its front end to the cross-bar 5 and has connection, by means of a link 29, with the cross-bar 26 to move the latter in its keepers when it is required to shift the cultivators laterally to bring them nearer to or farther away from the rows of plants. The outer end of the lever 28 projects beyond the cross-beam 2, so as to be readily accessible to the driver whether walking or perched upon the seat. The cultivators will be suitably equipped with shovels 30, which are disposed in such relative position as to meet the desired requirements. The rear ends of the cultivators have independent vertical adjustment and are connected by chains or cords 31 with operating-levers 32, mounted upon the cross-beam 2, and which have the ordinary hand-latch 33 to engage with a notched segment 34, by means of which the rear portions of the cultivators are sustained at the required elevation.

The front end of the implement is provided with supports 35, which comprise vertical shanks 36, having either caster-wheels or runners at their lower ends. The vertical shanks 36 pass through registering openings in the end portions of the cross-bars 3, and have collars 37 mounted thereon and held between the said bars 3, by means of which the shanks are secured in the desired adjusted position, binding-screws 38 passing through threaded openings in the sides of the collars 37, and bearing against the sides of the shanks 36 to hold the latter when properly positioned. The shanks 36 are preferably round and turn freely in the openings in the cross-bars 3, so as to adapt the supports to the direction of movement of the implement. Braces 39 are attached to the side beams 1 and incline forwardly and downwardly and have their lower ends provided with eyes 40, through which the shanks 36 pass, said braces strengthening and stiffening the supports, whereby they are capable of sustaining the load without giving way or binding in the openings in the cross-bars 3. The trailing devices provided at the lower ends of the shanks 36 may be runners 41 or caster-wheels 42, the latter construction being shown in Fig. 9 and the former in the remaining views of the drawings illustrating the supports 35.

The seat-bar 43 extends in substantially a horizontal position, and is provided at its inner end with a stirrup 44, which sits astraddle of a longitudinal beam 45, secured at its ends to the cross-bar 5 and beam 2, respectively, said stirrup having a series of openings 46 in its pendent portions to receive a pin or bolt 47, by means of which adjustable connection is had with the seat-bar and the stirrup 44. This stirrup 44 is adapted to move on the beam 45, so that the seat-bar may project more or less in the rear of the cross-beam 2, whereby the weight of the driver may be brought more or less directly above the ground-wheel 12. The outer end portion of the seat-bar passes through a slotted hanger 48, pendent from the cross-beam 2, and which has a vertical series of openings 49 to receive a pin or bolt 50, by means of which the outer end of the seat-bar can be raised or lowered, said seat-bar moving upon the pin or bolt 50 in its longitudinal adjustment. The seat 51 is secured to the outer end of the seat-bar 43. A rear support 52 is provided for each ground-wheel 12, and comprises side bars 53, having openings 54 in their front ends to receive the spindle 13, upon which the ground-wheel 12 is mounted, said wheel being placed between the side bars 53, as shown most clearly in Fig. 7. A trailing device 55 is journaled in a bearing provided at the junction of the rear ends of the side bars 53, so as to adapt itself to the direction of movement of the implement. This trailing device may be either a runner or caster-wheel. A stop 56 is located on the side of one of the bars 53, and is adapted to limit the vertical movement of the rear support 52 by engagement with the standard 14. This stop 56 has an extended vertical bearing-surface, which normally occurs a short distance from the standard 14, and which has its end portions constructed to engage with the said standard and limit the vertical movements of the said support 52. There will be a support for each ground-wheel 12, and the purpose of the same is to prevent the toppling over of the implement when the cultivator-shovels are raised out of the ground during the movement of the machine from one place to another and when making a turn at the end of the field or rows of plants to cultivate on the return travel. These supports 52 normally occupy a position a short distance above the ground, and only come into active service when the front end of the implement is tipped vertically under the weight of the driver or from any other cause.

It will be seen from the foregoing that the cultivators can be raised and lowered either by vertically adjusting the ground-wheels 12 and the supports 35 or by moving the draft-bars 21 and operating the levers 32, or by a combined adjustment of these several parts, as will be readily comprehended.

When the pole or tongue 9 is in place, the front supports 35 may be dispensed with, the front end of the machine being supported by the team in the usual manner, but when the pole or tongue is dispensed with the front supports 35 must be provided to carry the weight of the front end of the machine. Thus it will be seen that the cultivator can be used with or without a tongue, the team being hitched directly to the frame in the manner hereinbefore stated.

In different climates and for various purposes the style and character of the implement will be altered to meet the various requirements. Therefore it must be understood that changes in the form, proportion, and the minor details of construction may be resorted to without departing from the principle or sacrificing any of the advantages of this invention.

In order to provide for a lateral adjustment of the cultivators independently of the operating-lever 28, so that the driver may have both hands free for controlling and directing the team and for raising and lowering the cultivators, the latter are provided with stirrups or keepers 57, near the rear ends of the inner side beams, for the reception of the feet of the driver when mounted upon the seat 51. Hence when it is required to shift the cultivators laterally the same can be accomplished in a convenient manner by the driver moving his feet to one side or the other, as will be readily understood.

Having thus described the invention, what is claimed as new is—

1. In an agricultural implement, the combination with the frame and a cultivator, of a draft-rod having attachment at its lower end with the said cultivator and passing vertically through the frame, and a collar adjustably held upon the upper end of the said draft-rod, substantially as described for the purpose set forth.

2. In an agricultural implement, the combination with the frame having cultivating devices and provided with a longitudinal beam, of a stirrup movable on the longitudinal beam and having a vertical series of openings in its pendent members, a slotted hanger at the rear end of the longitudinal beam formed with a vertical series of openings, a pin or bolt adapted to be inserted into any one of the vertical series of openings of the said hanger, and a seat-bar in the plane of the longitudinal beam and supported by and adapted to slide and tilt upon the aforesaid pin, and having its inner or front end vertically adjustably connected with the stirrup, substantially as and for the purpose set forth.

3. In an agricultural implement, the combination with a vertical standard having a lateral spindle upon which is placed a ground-wheel, of a support comprising side bars to embrace the sides of the ground-wheel and mounted upon the spindle thereof, and having a trailing device at its outer end, substantially as set forth for the purpose described.

4. In an agricultural implement, the combination with a vertical standard having a spindle upon which is mounted a ground-wheel, of a support comprising side bars embracing the sides of the ground-wheel and mounted upon the said spindle, and having a trailing device at its rear end, and a stop provided on the side of one of the said bars to engage with the standard and limit the vertical movements of the said support, as and for the purpose described.

5. An agricultural implement for cultivating purposes comprising a frame provided with means for attachment of the team thereto, a pole, or tongue, removably connected with the said frame, ground-wheels having vertical adjustment relative to the frame and supporting the rear portion thereof, front supports adjustably connected with the frame and adapted to turn to conform to the direction of movement of the machine, draft-rods having their vertical portions adjustably connected with the frame and having their lower ends curved rearwardly, cultivators pivotally connected to the draft-rods, levers for adjusting the rear ends of the cultivators, a cross-bar provided with an arch having attachment with each of the cultivators and adapted to be shifted laterally to move the cultivators sidewise, and a seat-bar having both longitudinal and vertical adjustment, substantially as set forth.

In testimony that I claim the foregoing as my own I have hereto affixed my signature in the presence of two witnesses.

MIKEL WILLIAM THOMAS.

Witnesses:
WM. H. MARKS,
WILLIAM HARROLD.